(12) United States Patent
Wakasa

(10) Patent No.: US 8,724,148 B2
(45) Date of Patent: May 13, 2014

(54) RECORDING DEVICE THAT CAN CONNECT TO A CONTROL DEVICE, CONTROL METHOD FOR A RECORDING DEVICE THAT CAN CONNECT TO A CONTROL DEVICE, AND STORAGE MEDIUM THAT STORES A PROGRAM FOR CONTROLLING PARTS OF A RECORDING DEVICE THAT CAN CONNECT TO A CONTROL DEVICE

(75) Inventor: Shunichi Wakasa, Chikuma (JP)

(73) Assignee: Seiko Epson Corporation, Tokyo (JP)

( * ) Notice: Subject to any disclaimer, the term of this patent is extended or adjusted under 35 U.S.C. 154(b) by 140 days.

(21) Appl. No.: 13/289,368

(22) Filed: Nov. 4, 2011

(65) Prior Publication Data

US 2012/0120442 A1    May 17, 2012

(30) Foreign Application Priority Data

Nov. 17, 2010    (JP) .................................. 2010-256868

(51) Int. Cl.
*G06F 3/12*    (2006.01)

(52) U.S. Cl.
USPC .......................................................... 358/1.15

(58) Field of Classification Search
CPC .................................................. H04N 1/00204
See application file for complete search history.

(56) References Cited

U.S. PATENT DOCUMENTS

| 6,618,162 B1* | 9/2003 | Wiklof et al. ................ 358/1.15 |
| 2006/0256367 A1* | 11/2006 | Wei .............................. 358/1.15 |
| 2007/0097409 A1* | 5/2007 | Goings et al. ................ 358/1.14 |

FOREIGN PATENT DOCUMENTS

| JP | 08-278867 A | 10/1996 |
| JP | 09-231033 A | 9/1997 |
| JP | 2000-203124 A | 7/2000 |
| JP | 2008-272942 A | 11/2008 |
| JP | 2010-152665 A | 7/2010 |

* cited by examiner

*Primary Examiner* — Jeremiah Bryar
(74) *Attorney, Agent, or Firm* — Nutter McClennen & Fish LLP; John J. Penny, Jr.; Christina M. Sperry

(57) ABSTRACT

A control device is notified of recording problems in a recording device based on the location of drive data in a storage device. A printer stores a start-recording position as start-recording position data, writes drive data reflecting the start-recording position in a line buffer, drives a line thermal head based on the buffered drive data to record on a recording medium, and the printer returns information denoting the start-recording position based on a request from the host computer.

16 Claims, 5 Drawing Sheets

RECORDING DEVICE THAT CAN CONNECT TO A CONTROL DEVICE, CONTROL METHOD FOR A RECORDING DEVICE THAT CAN CONNECT TO A CONTROL DEVICE, AND STORAGE MEDIUM THAT STORES A PROGRAM FOR CONTROLLING PARTS OF A RECORDING DEVICE THAT CAN CONNECT TO A CONTROL DEVICE

This application claims priority under 35 U.S.C. §119 to Japanese Patent Application No. 2010-256868 filed on Nov. 17, 2010, the entire disclosure of which is expressly incorporated by reference herein.

BACKGROUND

1. Technical Field

The present invention relates to a recording device that records on a recording medium, a control method for the recording device, and a storage medium that stores a program for controlling the recording device.

2. Related Art

Recording systems that include a control device (information processing device) and a recording device (image forming device) and are configured so that the recording device executes a recording operation as controlled by the control device are known from the literature. See, for example, Japanese Unexamined Patent Appl. Pub. JP-A-2010-152665.

In order to record on the recording medium with this recording system, recording data is output from the control device to the recording device, and the recording device outputs a report indicating that recording is completed to the control device after the recording device finishes recording based on the output data, that is, after the recording-related operations of the mechanisms in the recording device are completed.

However, while the recording device in this system notifies the control device when recording is completed, the control device can only detect from this report that the recording operation of the recording device has ended, and cannot determine whether or not the recording operation of the recording device resulted in the image being normally recorded on the recording medium. For example, due to a mismatch in the baud rate settings for communication between the host computer (control device) side and the recording device side, the recording device may not be able to receive data from the host computer normally and may record based on data acquired at the wrong time. This can result in unintended characters being recorded, that is, garbled or garbage characters being printed. Because the recording process is thus executed even when data is received at the wrong timing, the recording device reports to the host computer when the recording operation is completed. Recording is also reported to have completed normally even if the recording device is not configured with the settings intended by the control device, such as the number of characters recorded per line, and the intended result is not achieved. The host computer is thus unable to know if recording is completed normally. When this happens, the host computer may continue sending data even though the reason why images are not being correctly recorded has not been resolved. Because the recording device can thus continue recording wastefully, the host computer needs to be able to detect as quickly as possible when recording is not proceeding normally so that appropriate corrective action can be taken, such as stopping transmission of additional data.

SUMMARY

At least of one embodiment of the present invention is directed to solving the foregoing problem by enabling quickly detecting recording problems on the recording device.

A first aspect of the invention is a method of controlling a recording device that can connect to a control device, including steps of: generating and writing to a storage unit drive data that drives a recording head based on data received from the control device; reading the drive data from the storage unit, driving the recording head, and recording on a recording medium; and sending to the control device information denoting a first position, which is the position where the drive data is written in the storage unit or the position where reading and recording the drive data starts, or information denoting a second position, which is the position where writing the drive data in the storage unit ends or the position where reading and recording the drive data ends.

Drive data for driving the recording head is converted (written) to the storage unit (buffer) referenced to a start-recording position (first position). The first position may be the position where reading and recording the drive data starts. The recording device sends the first position information to the control device. The recording device may also send second position information, which is the position where writing the drive data ended, or the stop-recording position where recording ended, to the control device. Based on this position information, the control device can know at least the position where recording to the storage unit ended in the recording device, and can determine that there is a problem with recording by the recording device, such as unintended recording, if there is a difference with the position that is expected in the storage unit.

This aspect of the invention also enables the control device to request information denoting the start-recording position or information about the stop-recording position from the recording device, receive a response to this request from the recording device, and quickly detect recording problems in the recording device.

Another aspect of the invention is a method of controlling a recording device wherein information related to the drive data in the storage unit before recording is sent with information denoting the first position to the control device.

Another aspect of the invention is a method of controlling a recording device wherein information related to the drive data in the storage unit after recording is sent with information denoting the second position to the control device.

Another aspect of the invention is a method of controlling a recording device wherein the drive data is generated and written to the storage unit in line units, and the first position is the position where the drive data is written or the position where reading and recording the drive data starts in the line, and the second position is the position where writing the drive data ends or the position where reading and recording the drive data ends in the line.

Another aspect of the invention is a method of controlling a recording device wherein the drive data is generated and written to the storage unit in page units, and the first position is the position where the drive data is written or the position where reading and recording the drive data starts on the page, and the second position is the position where writing the drive data ends or the position where reading and recording the drive data ends on the page.

When a CR or LF character is received at the end of one line, or a FF character is received at the end of one page, the start-recording position denotes the location of the beginning of the next line or the position of the beginning of the next page, and the stop-recording position data denotes the position of the end of one line or the position of the end of one page. This is also the case when an amount of data filling one line or one page is received. When the start-recording position or stop-recording position is at this position, recording is normal.

However, if the start-recording position or stop-recording position indicates a position in the middle of the line or the middle of the page, the possibility that recording is not normal is high.

If location information for a specific unit such as one line or one page related to the drive data before recording or after recording is also sent to the control device, the control device can easily know if recording was performed normally.

A method of controlling a recording device according to another aspect of the invention also has a step of clearing the drive data in the storage unit based on a command received from the control device to clear the storage unit.

With the control method according to this aspect of the invention, the recording device can clear the storage unit and quickly resolve the recording problem based on the buffer clearing command when the control device determines that there is a problem with recording on the recording device.

A method of controlling a recording device according to another aspect of the invention also has a step of recording the drive data in the storage unit from a specified position based on a re-recording command received from the control device.

The control method according to this aspect of the invention enables recording drive data to the recording medium from a specific position where it will not be recorded incorrectly, such as the beginning, after ensuring there is no drive data that will be recorded incorrectly.

Another aspect of the invention is a recording device that can connect to a control device and includes a control unit that generates and writes to a storage unit drive data that drives a recording head based on data received from the control device, and reads the drive data from the storage unit, drives the recording head, and records on a recording medium. The control unit sends to the control device information denoting a first position, which is the position where the drive data is written in the storage unit or the position where reading and recording the drive data starts, or information denoting a second position, which is the position where writing the drive data in the storage unit ends or the position where reading and recording the drive data ends.

Drive data for driving the recording head is converted (written) to the storage unit (buffer) referenced to a start-recording position (first position). The first position may be the position where reading and recording the drive data starts. The recording device sends the first position information to the control device. The recording device may also send second position information, which is the position where writing the drive data ended, or the stop-recording position where recording ended, to the control device. Based on this position information, the control device can know at least the position where recording to the storage unit ended in the recording device, and can determine that there is a problem with recording by the recording device, such as unintended recording, if there is a difference with the position that is expected in the storage unit.

This aspect of the invention also enables the control device to request information denoting the start-recording position or information about the stop-recording position from the recording device, receive a response to this request from the recording device, and quickly detect recording problems in the recording device.

In a recording device according to another aspect of the invention, the control unit sends information related to the drive data in the storage unit before recording together with information denoting the first position to the control device.

In a recording device according to another aspect of the invention, the control unit sends information related to the drive data in the storage unit after recording together with information denoting the second position to the control device.

In a recording device according to another aspect of the invention, the control unit generates and writes the drive data to the storage unit in line units, and the first position is the position where reading and recording the drive data starts in the line, and the second position is the position where reading and recording the drive data ends in the line.

In a recording device according to another aspect of the invention, the control unit generates and writes the drive data to the storage unit in page units, and the first position is the position where reading and recording the drive data starts on the page, and the second position is the position where reading and recording the drive data ends on the page.

When a CR or LF character is received at the end of one line, or a FF character is received at the end of one page, the start-recording position denotes the location of the beginning of the next line or the position of the beginning of the next page, and the stop-recording position data denotes the position of the end of one line or the position of the end of one page. This is also the case when an amount of data filling one line or one page is received. When the start-recording position or stop-recording position is at this position, recording is normal.

However, if the start-recording position or stop-recording position indicates a position in the middle of the line or the middle of the page, the possibility that recording is not normal is high.

If location information for a specific unit such as one line or one page related to the drive data before recording or after recording is also sent to the control device, the control device can easily know if recording was performed normally.

In a recording device according to another aspect of the invention, the control unit clears the drive data in the storage unit based on a command received from the control device to clear the storage unit.

With the recording device according to this aspect of the invention, the recording device can clear the storage unit and quickly resolve the recording problem based on the buffer clearing command when the control device determines that there is a problem with recording on the recording device.

In a recording device according to another aspect of the invention, the control unit records the drive data in the storage unit from a specified position based on a re-recording command received from the control device.

The recording device according to this aspect of the invention can record drive data to the recording medium from a specific position where it will not be recorded incorrectly, such as the beginning, after ensuring there is no drive data that will be recorded incorrectly.

Another aspect of the invention is a storage medium that stores a program for controlling parts of a recording device that can connect to a control device and has a control unit that generates and writes to a storage unit drive data that drives a recording head based on data received from the control device, and reads the drive data from the storage unit, drives the recording head, and records on a recording medium, wherein the program causes the control unit to send to the control device information denoting a first position, which is the position where the drive data is written in the storage unit or the position where reading and recording the drive data starts, or information denoting a second position, which is the position where writing the drive data in the storage unit ends or the position where reading and recording the drive data ends.

Drive data for driving the recording head is converted (written) to the storage unit (buffer) referenced to a start-recording position (first position). The first position may be the position where reading and recording the drive data starts. The recording device sends the first position information to the control device. The recording device may also send second position information, which is the position where writing the drive data ended, or the stop-recording position where recording ended, to the control device. Based on this position information, the control device can know at least the position where recording to the storage unit ended in the recording device, and can determine that there is a problem with recording by the recording device, such as unintended recording, if there is a difference with the position that is expected in the storage unit.

This aspect of the invention also enables the control device to request information denoting the start-recording position or information about the stop-recording position from the recording device, receive a response to this request from the recording device, and quickly detect recording problems in the recording device.

Effect of the Invention

The invention enables quickly detecting problems with recording by the recording device.

DESCRIPTION OF EMBODIMENTS

A preferred embodiment of the present invention is described below with reference to the accompanying figures.

Figure 1:
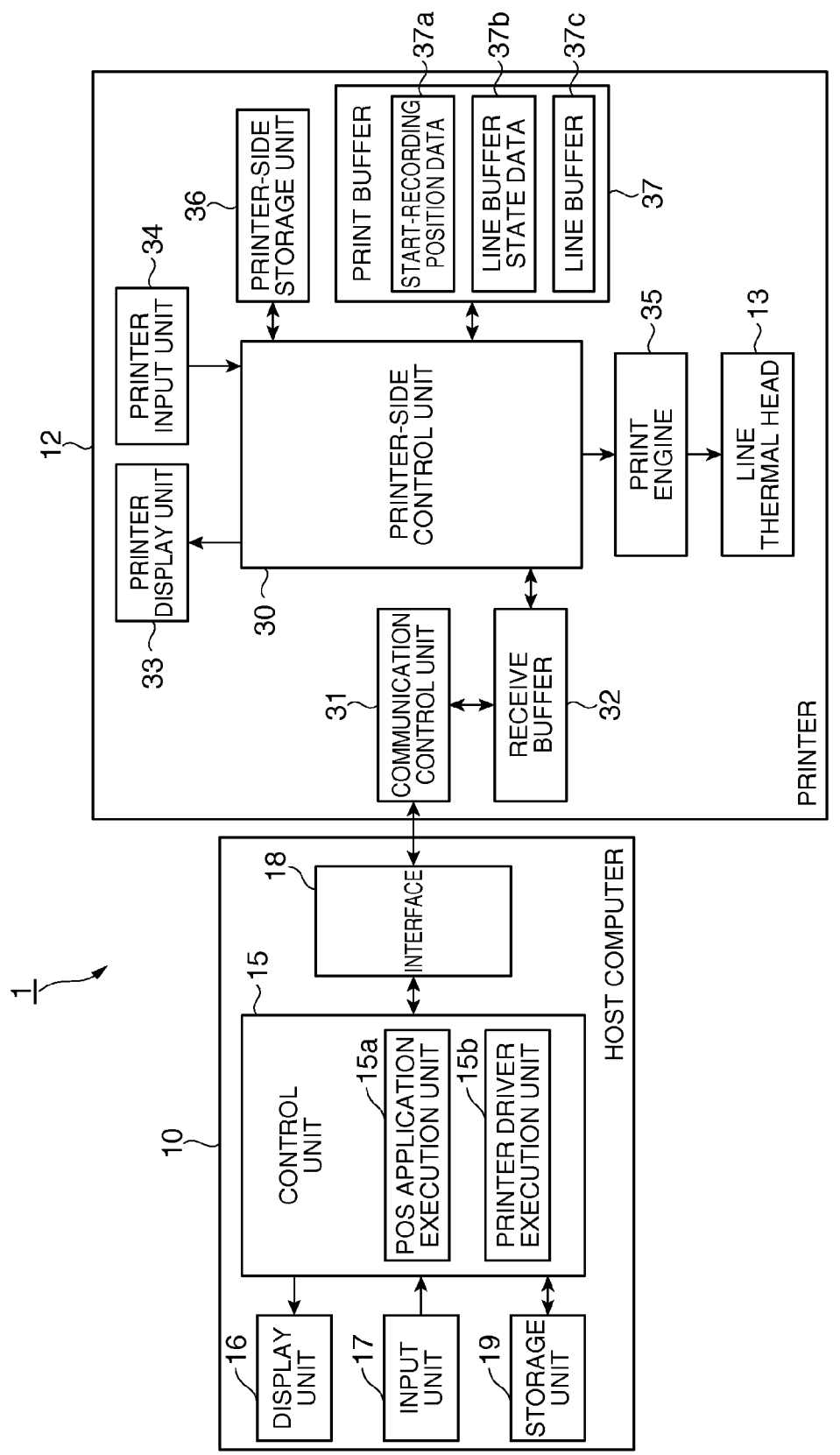
FIG. 1 is a block diagram showing the functional configuration of a recording system.

FIG. 1 is a block diagram showing the functional configuration of a recording system 1 according to this embodiment of the invention.

The recording system 1 is a system that is used in retail stores such as supermarkets and convenience stores, and issues receipts for product purchases and payments by customers visiting the store, and as shown in FIG. 1 includes a host computer 10 (control device) and a printer 12 (recording device).

As shown in FIG. 1, the host computer 10 includes a control unit 15, display unit 16, input unit 17, interface 18, and storage unit 19.

The control unit 15 centrally controls other parts of the host computer 10, and includes a CPU as an operating unit, ROM that nonvolatilely stores a basic control program that is executed by the CPU and data related to the basic control program, RAM that temporarily stores programs executed by the CPU and data associated with those programs, and other peripheral circuits.

As shown in FIG. 1, the control unit 15 also includes a POS application execution unit 15a and a printer driver execution unit 15b that are further described below.

The display unit 16 has a display panel such as a liquid crystal display or organic electroluminescent display panel, and displays information on the display panel as controlled by the control unit 15.

The input unit 17 is connected to input devices such as a keyboard, mouse, barcode reader, or card reader, and outputs the output signals from the input devices to the control unit 15. A barcode reader is used to read barcodes recorded on product packaging, for example, and a card reader is used to read information recorded on credit cards and membership cards, for example. Information acquired using the barcode reader, card reader, or other input device is used for issuing receipts.

The interface 18 communicates with the printer 12 according to a known communication protocol as controlled by the control unit 15.

The storage unit 19 rewritably records data, and includes a hard disk drive, EEPROM device, or other storage device.

The printer 12 is a thermal head printer that issues receipts by conveying thermal roll paper R (FIG. 2), which is a recording medium wound into a roll, by a roller platen, recording an image by applying heat by a line thermal head 13 (recording head) with heat elements 14 (FIG. 2) to the recording surface of the thermal roll paper R, and then cutting the thermal roll paper R at a specific position.

As shown in FIG. 1, the printer 12 has a printer-side control unit 30, communication control unit 31, receive buffer 32, printer display unit 33, printer input unit 34, print engine 35, printer-side storage unit 36, and print buffer 37 (storage unit).

The printer-side control unit 30 centrally controls the printer 12, and like the control unit 15 described above has a CPU, ROM, RAM, and other peripheral circuits.

The communication control unit 31 communicates with the host computer 10 according to a specified protocol. More specifically, the communication control unit receives signals sent from the host computer 10, demodulates (decodes) the received signals, and sequentially generates and stores the received commands and data to the receive buffer 32.

The receive buffer 32 is a temporary storage device that sequentially stores commands and data output by the communication control unit 31. The commands and data received by the communication control unit 31 from the host computer 10 are stored in the receive buffer 32 in the order received. The commands and data stored in the receive buffer 32 are in principle read and executed by the printer-side control unit 30 in the order received.

The printer display unit 33 has LEDs or a display panel for displaying information such as the operating status of the printer 12, and displays information on the LEDs or display panel as controlled by the printer-side control unit 30.

The printer input unit 34 is connected to operating switches disposed to the printer 12, and detects and outputs operation of the operating switches to the printer-side control unit 30.

While monitoring the output of sensors such as a paper-end sensor and remaining paper sensor as controlled by the printer-side control unit 30, the print engine 35 operates the line thermal head 13, a media conveyance motor that drives the platen roller conveying the thermal roll paper R and a cutter drive motor that drives a cutter having a cutting mechanism for cutting the thermal roll paper R at a specific position, and produces receipts by recording images on the thermal roll paper R and then cutting the thermal roll paper R after an image is formed.

The printer-side storage unit 36 is a nonvolatile storage device such as flash memory or a hard disk drive enabling rewritably storing data.

The print buffer 37 is a buffer for temporarily storing data including the drive data whereby the line thermal head 13 is driven. Start-recording position data 37a (or stop-recording position data) and line buffer state data 37b are stored in the print buffer 37, and a line buffer 37c is reserved in a specific part of the print buffer 37. These are further described below. Note that the print buffer 37 may alternatively be rendered in a specific storage area in printer-side control unit 30 memory, or in a dedicated memory device.

The basic operation whereby the recording system 1 creates a receipt is described next by describing the POS application execution unit 15a and printer driver execution unit 15b.

By running a POS application that is pre-installed to the host computer 10, the POS application execution unit 15a accesses a server not shown as needed during each transaction to get information describing the products purchased in the transaction, product price information, purchase amount information, and other information to be recorded on the receipt, and generates and outputs recording data related to the image to be recorded on the receipt based on the acquired information to the printer driver execution unit 15b.

By running a printer driver that is pre-installed on the host computer 10, the printer driver execution unit 15b generates and outputs to the printer-side control unit 30 data and control commands suitable to the command system of the printer 12 based on the recording data input from the POS application execution unit 15a.

Included in these control commands are commands causing the printer 12 to produce a receipt, including commands causing the conveyance mechanism to convey the thermal roll paper R, commands (image recording commands) for driving the line thermal head 13 to record images on the thermal roll paper R, and commands causing the cutter mechanism to cut the thermal roll paper R. Included in the data is image data describing the image to be recorded on the thermal roll paper R.

The commands contained in the control commands and the data input to the printer 12 are sequentially stored in the receive buffer 32 by the communication control unit 31, and are sequentially read and executed by the printer-side control unit 30.

The operation of the printer 12 when recording an image on thermal roll paper R is described next.

To record an image on the thermal roll paper R in this embodiment of the invention, a command ("image recording command" below) specifying recording an image on the thermal roll paper R, and image data for the image to be recorded, are output from the host computer 10 to the printer 12, and stored in the receive buffer 32 of the printer 12.

The printer-side control unit 30 reads the image recording commands and image data stored in the receive buffer 32, generates, drive data, and records an image.

More specifically, the printer-side control unit 30 first references the start-recording position data 37a based on the image data stored in the receive buffer 32, and after determining the start-recording position (described below) generates and writes the drive data from the start-recording position in the line buffer 37c.

When recording text, the image data is sent as character data and converted to data for the individual characters in the line buffer 37c. A CR (carriage return), LF (line feed) character, or other command code denoting the end of a line is sent at the end of the text string printed on one line, and character data strings segmented in line units are written to the line buffer 37c.

When the line buffer 37c corresponds to a page, a storage area corresponding to one page is reserved for the line buffer 37c, and image data is sent with address information denoting where on the page the image data is to be printed and stored at the designated position on the page. A FF (form feed) command defining a page break is sent at the end of the image data for the page, and image data segmented into page units is written to the line buffer 37c.

A plurality of heat elements 14 providing the specified print resolution are arrayed on the line thermal head 13 described above. The drive data is dot data controlling which heat elements 14 are driven in each line formed by the heat elements 14 according to the image to be recorded on the recording surface of the thermal roll paper R.

After the drive data is written to the line buffer 37c, a drive circuit (not shown in the figure) rendered in the print engine 35 drives the heat elements 14 by outputting drive signals to the appropriate heat elements 14 line by line while synchronizing with a timing control signal based on the drive data written to the line buffer 37c. An image is thereby recorded on the thermal roll paper R.

The printer-side control unit 30 reads and sends the drive data from the line buffer 37c to the line thermal head 13 to drive the line thermal head 13. The start-recording position data 37a (information denoting a first position) is the position on the line, such as the location of a character, where reading the line buffer 37c and driving the heat elements 14 starts, and more specifically is a memory address in the line buffer 37c. The stop-recording position data (information denoting a second position) is, for example, the location of the character where reading from the line buffer 37c and driving the heat elements 14 stops. The start-recording position data 37a is data storing information related to the start-recording position, which is the position where recording an image on the thermal roll paper R starts, and more specifically is either a default value (a value placing the start-recording position at a specific position; a value indicating that the start-recording position is set to the position of the first column in the line because recording normally starts from the first column of the next line after recording the first line ends), or is a value defining the start-recording position, such as the position of the character on the line when recording starts in the middle of a line.

When the line buffer 37c corresponds to a page, the default value is an address denoting the edge of one of the four sides of the page because reading the drive data and driving the heat elements 14 starts from the edge of one of the four sides of the next page when recording the first page ends. When recording starts in the middle of a page, the address of that position on the page is the value denoting the start-recording position.

Figure 2:
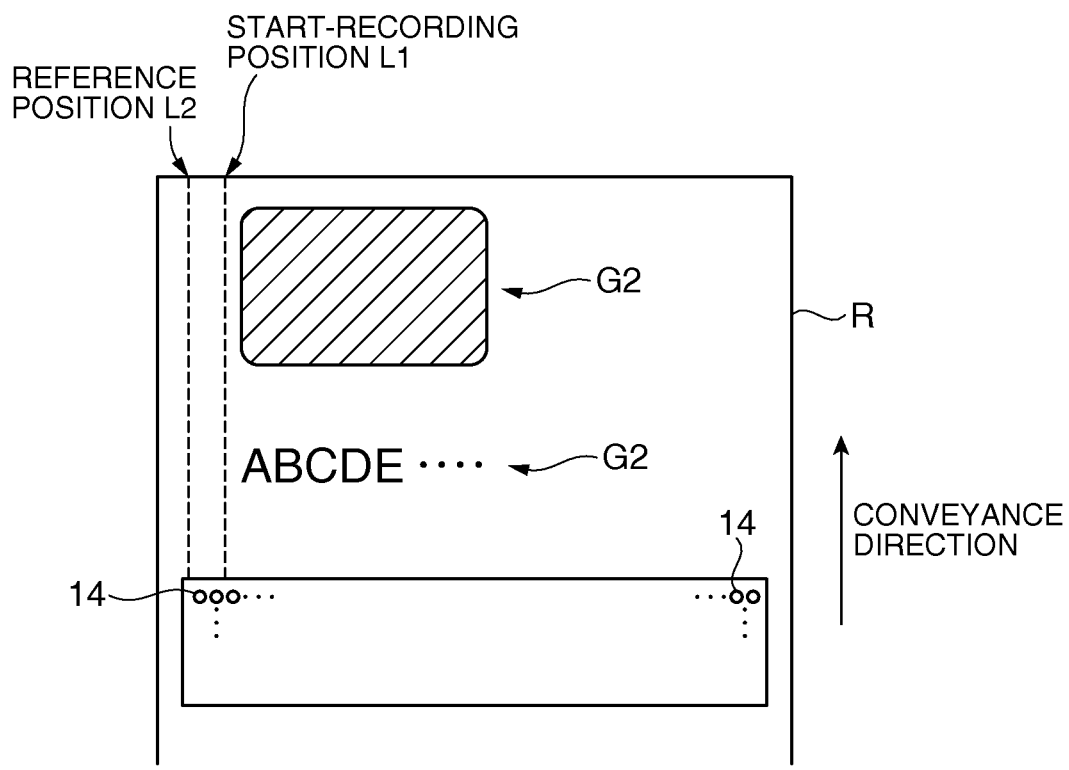
FIG. 2 schematically describes thermal roll paper and a line thermal head.

FIG. 2 schematically describes recording an image on the thermal roll paper R by the line thermal head 13 in order to describe the start-recording position.

As shown in FIG. 2, the line thermal head 13 extends widthwise across the thermal roll paper R, and one line is formed by the heat elements 14 arrayed with a specific interval therebetween in the same widthwise direction.

The start-recording position is information denoting where recording an image starts when an image is recorded to the thermal roll paper R, and an image recorded on the thermal roll paper R is recorded in the conveyance direction on the right side starting from the start-recording position.

In the example shown in FIG. 2, if the start-recording position is the position denoted by L1, and an image G1 denoting a logo or other graphic and an image G2 denoting a text string composed of plural characters formed consecutively widthwise are recorded on the thermal roll paper R, the images are recorded in the conveyance direction on the right side starting from start-recording position L1.

As described above, when writing the drive data to the line buffer 37c based on the image data stored in the receive buffer 32, the printer-side control unit 30 references the start-recording position data 37a to get the start-recording position, and then writes the data to the line buffer 37c starting from the start-recording position. More specifically, the printer-side control unit 30 gets a value denoting the start-recording position by referencing the start-recording position data 37a. This start-recording position value is set, for example, as the offset (a value denoting a number of dots) from reference position L2. The printer-side control unit 30 then writes drive data for driving the heat elements 14 of the line thermal head 13 to the line buffer 37c so that the image represented by the image data is recorded in the conveyance direction in an area on the right side starting from the start-recording position denoted by the acquired value. In the example shown in FIG. 2, the printer-side control unit 30 writes drive data to the line buffer 37c for driving the line thermal head 13 so that an image is not recorded by the heat elements 14 in the area between reference position L2 and start-recording position L1, and images are recorded in the conveyance direction by the heat elements 14 disposed on the right side of the start-recording position L1.

The value of the start-recording position data 37a is set as described below.

More specifically, an image recording command includes data denoting the start-recording position of the image that is to be recorded by the image recording command. When an image recording command is read, the printer-side control unit 30 gets the start-recording position of the image to be recorded according to the image recording command based on data denoting the start-recording position, and overwrites the content of the start-recording position data 37a to store a value denoting the acquired start-recording position.

Note that when the start-recording position is not set, the start-recording position data 37a uses the default value.

As described above, the line thermal head 13 is driven and an image is recorded on the thermal roll paper R based on the drive data written to the line buffer 37c, and the drive data written to the line buffer 37c for driving the heat elements 14 on a particular line is erased from the line buffer 37c at the appropriate timing after it is used to drive the heat elements 14 to record that line. The position of that drive data is stored in the print buffer 37 as stop-recording position data.

The start-recording position data 37a is reset to the default value when recording a continuous image specified for recording by the image recording command is completed normally. Because a CR or LF character is sent at the end of each line, and a FF character is sent at the end of one page, the start-recording position data 37a can be reset to the default value when one of these commands is executed. The default value is also set when an amount of data that fits completely within one line or one page is received. The default value is thus set when recording is completed normally.

After recording an image based on one image recording command is completed, drive data is, in principle, not left in the line buffer 37c and the start-recording position data 37a is set to a default value such as the position of a character in the first column of the line or the location of one side of the page. When stop-recording position data is used, the position when recording ended, that is, the column position of the last character on the line or the position of the side denoting the end of the page, is set.

After the printer records based on an image recording command and data in a recording system according to the related art, that is, after the recording operation is completed by the line thermal head 13 and other components, a report indicating that recording ended is sent to the host computer. This enables the host computer to know that the recording operation ended, but does not enable the host computer to know if the recording operation resulted in the image being recorded normally to the thermal roll paper. For example, the host computer cannot detect if garbage characters were printed because the printer could not normally execute commands and data received from the host computer due to a mismatch between the baud rate settings of the host computer and the printer. When this happens it is therefore necessary to enable detecting as soon as possible when a printer recording error occurs because the printer may continue recording without the cause of images not being correctly recorded having been corrected.

This embodiment of the invention therefore enables the host computer 10 to quickly detect when a printer 12 recording error occurs by executing the operation described below.

Figures 3A, 3B:
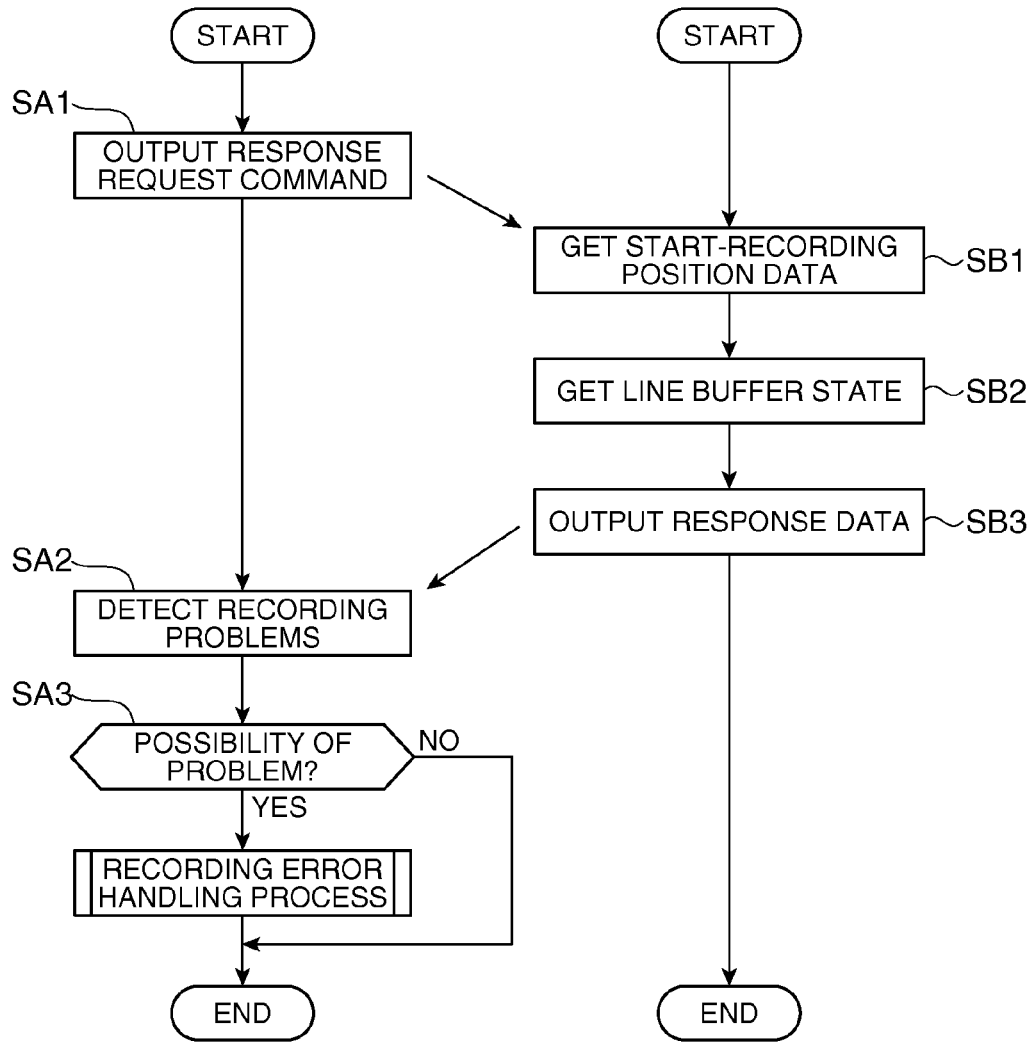
FIGS. 3A and 3B are flow charts describing the operation of a host computer and a printer.

FIG. 3 is a flow chart showing the operation of the host computer 10 and the printer 12, FIG. 3A showing the operation of the host computer 10 and FIG. 3B showing the operation of the printer 12.

The process shown in FIG. 3 is a process that is executed after a control command for issuing a receipt is output from the host computer 10 to the printer 12 while the receipt printing operation is performed by the printer 12 based on the output control command.

The printer driver execution unit 15b of the host computer 10 first outputs a response request command to the printer 12 (step SA1). Output of this response request command is handled by a function of the printer driver.

The response request command is a command requesting the printer 12 to send (return) information denoted by the start-recording position data 37a and information indicating whether or not drive data was written to the line buffer 37c. The process executed by the printer 12 in response to this response request command is described below.

This response request command is output from the host computer 10 to the printer 12 at a suitable time so that the printer 12 responds to the response request command immediately after recording an image on the thermal roll paper R based on the image recording command described above. For example, the response request command is a command that is executed with priority over other commands when the response request command is stored in the receive buffer 32 even if other unexecuted commands are also stored in the receive buffer 32, and causes the printer 12 to report to the host computer 10 when recording an image based on the image recording command is completed. The host computer 10 outputs the response request command when a report that recording an image based on the image recording command is completed is received. Alternatively, the response request command may be embedded in a control command so that the response request command is automatically executed after the image recording command.

The printer-side control unit 30 of the printer 12 to which the response request command is input references the start-recording position data 37a, and determines if the start-recording position data 37a holds the default value or some other value denoting the start-recording position (step SB1).

The printer-side control unit 30 then references the line buffer state data 37b, and determines if drive data remains in the line buffer 37c (step SB2). The line buffer state data 37b stores information indicating if data has been erased from all of the line buffer 37c and absolutely no data remains therein, or if even a small amount of drive data remains in the line buffer 37c. The printer-side control unit 30 monitors the state of the line buffer 37c, and updates the content of the line buffer state data 37b appropriately according to the state of the line buffer 37c.

The printer-side control unit 30 then outputs data (referred to below as response data) including information indicating if the start-recording position data 37a is set to the default value or another value defining the start-recording position, and information indicating if drive data remains in the line buffer 37c, to the host computer 10 (step SB3).

The printer driver execution unit 15b of the host computer 10 to which the response data was input then determines based on the response data if there is a possibility of a recording error in the printer (step SA2).

More specifically in step SA2, drive data does not, in principle, remain in the line buffer 37c after recording an image based on the image recording command, and the start-recording position data 37a is set to the default value.

This is because a CR or LF code is sent at the end of one line, and a FF code is sent at the end of one page, and the default value can be reset when one of these commands is executed. The default value is also set when an amount of data filling one line or one page is sent.

However, drive data may be left in the line buffer 37c after recording an image based on the image recording command. Because a CR or LF character is not sent at the end of one line, or a FF character is not sent at the end of one page, the drive data cannot be segmented and recorded in these units. In this case, the start-recording position data 37a or the stop-recording position data indicates a position in the middle of one line or one page.

The start-recording position data 37a may also be data indicating the position where writing drive data to the line buffer 37c starts. The stop-recording position data may be data indicating where writing drive data to the line buffer 37c stopped. When a CR or LF character is received at the end of one line, or a FF character is received at the end of one page, the start-recording position data 37a denotes the location of the beginning of the next line or the position of the beginning of the next page, and the stop-recording position data denotes the position of the end of one line or the position of the end of one page. This is also the case when an amount of data filling one line or one page is received.

Because a CR or LF character is not received at the end of one line, or a FF character is not received at the end of one page, if the start-recording position data 37a is the position where writing drive data to the line buffer 37c starts and a reception or recording error occurs, the position where writing drive data to the line buffer 37c starts after data is received is typically some random position in one line or one page.

Furthermore, the data usually does not fill one line or one page, and the start-recording position data 37a or stop-recording position data points to a position in the middle of one line or the middle of one page.

This occurs when drive data remains in the line buffer 37c after recording an image based on the image recording command, such as when there is a mismatch between the baud rate settings of the host computer 10 and the printer 12, image recording commands and image data are not stored as expected in the receive buffer 32 and drive data is therefore not written normally to the line buffer 37c, or when the heat elements 14 are not driven normally based on the saved drive data due to an image recording command read error or an error in the heat element 14 drive process. When this happens, an image containing garbled characters may be recorded on the thermal roll paper R, the required image may not be recorded, or some other problem with the recorded image may occur.

The start-recording position data 37a may also not be the default value even when drive data remains in the line buffer 37c after recording an image based on the image recording command. This occurs when, for example, image data that should be written to the line buffer 37c is discarded due to an error reading the command as described above, or when drive data containing an error is used due to a process error. In this case, an image containing garbage characters may be recorded on the thermal roll paper R, the required image may not be recorded, or other errors in the recorded image may occur.

In step SA2, therefore, the printer driver execution unit 15b determines based on the response data input from the printer 12 if drive data remains in the line buffer 37c, or if the start-recording position data 37a is not the default value even though no drive data remains; and if drive data remains in the line buffer 37c, or if the start-recording position data 37a is not the default value even though no drive data remains, determines if there is a possibility of an unexpected error in the image recorded on the thermal roll paper R based on the image recording command, that is, if there is a possibility of a problem in recording by the printer 12.

Note that if an image is recorded when drive data remains in the line buffer 37c or the start-recording position data 37a is not set to the default value, writing drive data normally to the line buffer 37c and acquiring the correct start-recording position are obstructed, and images cannot be recorded normally.

If as a result of the decision in step SA2 a possibility of a recording error in the printer 12 is not detected (step SA3 returns No), the printer driver execution unit 15b ends the process.

If as a result of the decision in step SA2 a possibility of a recording error in the printer 12 is detected (step SA3 returns Yes), the printer driver execution unit 15b executes a recording error handling process (step SA4) and then ends the process.

Figure 4:
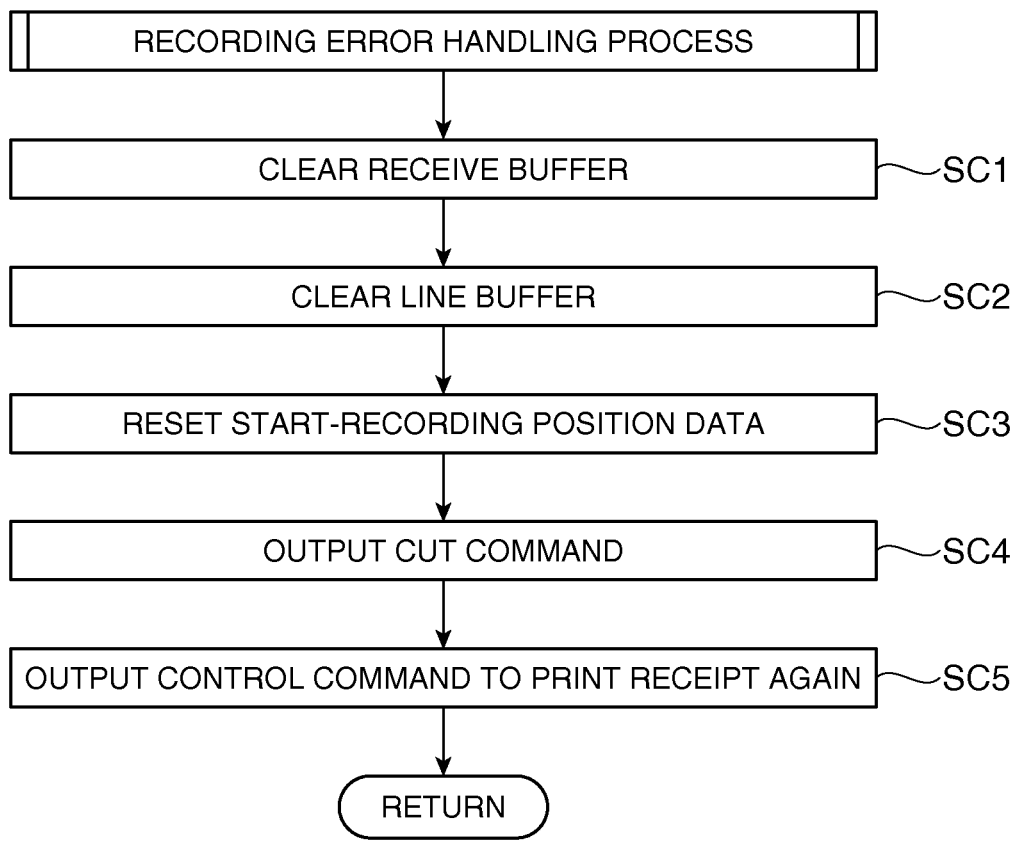
FIG. 4 is a flow chart showing the operation of the host computer.

FIG. 4 is a flow chart showing details of the recording error handling process in step SA4 in FIG. 3.

This recording error handling process is a process that is executed when there is a possibility that image recording based on the image recording command is not performed normally. When this happens there is a possibility that an image containing an error will be recorded on the recording surface of the receipt to be issued. Because the receipt is given to the customer, images recorded on the issued receipts must be free of errors. The object of this recording error handling process is therefore to destroy any receipt that is detected to have possibly been recorded with an image containing an error, and issue a new receipt.

In this recording error handling process the printer driver execution unit 15b first outputs to the printer 12 a command for clearing the receive buffer 32, and thereby stops the process associated with issuing a receipt scheduled to be executed next, and interrupts the process associated with issuing receipts (step SC1).

Next, the printer driver execution unit 15b outputs to the printer 12 a command for clearing the line buffer 37c, and clears the line buffer 37c (step SC2).

Next, the printer driver execution unit 15b outputs to the printer 12 a command for clearing the start-recording position data 37a, and sets the start-recording position data 37a to the default value (step SC3). Note that the process in step SC3 may be executed only when the start-recording position data 37a is not the default value.

The actions of step SC2 and step SC3 eliminate the cause of the recording error, including drive data remaining in the line buffer 37c and the start-recording position data 37a not being the default value, and restore a state in which normal image recording is possible.

Next, the printer driver execution unit 15b outputs to the printer 12 a cut command for cutting the thermal roll paper R (step SC4). The printer 12 to which this cut command is input conveys the thermal roll paper R an appropriate distance and cuts the thermal roll paper R. As a result, the portion of the thermal roll paper R containing an image that may have been recorded with an error is cut off. Next, the printer driver execution unit 15b again outputs to the printer 12 a control command including a command sequence for executing the receipt printing operation (step SC5).

As a result, the receipt can be reissued in a state enabling normal image recording.

As shown in FIG. 3 and FIG. 4 above, a recording system 1 according to this embodiment of the invention enables the host computer 10 to quickly detect the possibility that an image was not properly recorded to the thermal roll paper R, and perform a useful process when such is detected.

The commands output from the host computer 10 to the printer 12 include commands enabling the printer 12 to normally execute the process associated with the command only when there is no drive data remaining in the line buffer 37c and the start-recording position data 37a is set to the default value. These commands include, for example, the foregoing image recording command, and commands for performing a process related to image recording assuming that the start-recording position data 37a is the default value (for example, commands for recording an image after setting the position to which the image is to be recorded according to a reference other than the set start-recording position, such as a command that specifies recording an image centered or left-aligned on the thermal roll paper R). Such a command is referred to below as a "first command."

Commands output from the host computer 10 to the printer 12 also include commands enabling the printer 12 to normally execute the process associated with the command when no drive data remains in the line buffer 37c regardless of the value stored in the start-recording position data 37a. These commands include, for example, commands that force recording an image at a specific position without using the start-recording position when recording an image. Such a command is referred to below as a "second command."

Knowing the existence of such first commands and second commands, the recording system 1 according to this embodiment of the invention uses the above-described response request command to perform a useful process such as described below.

Figure 5:
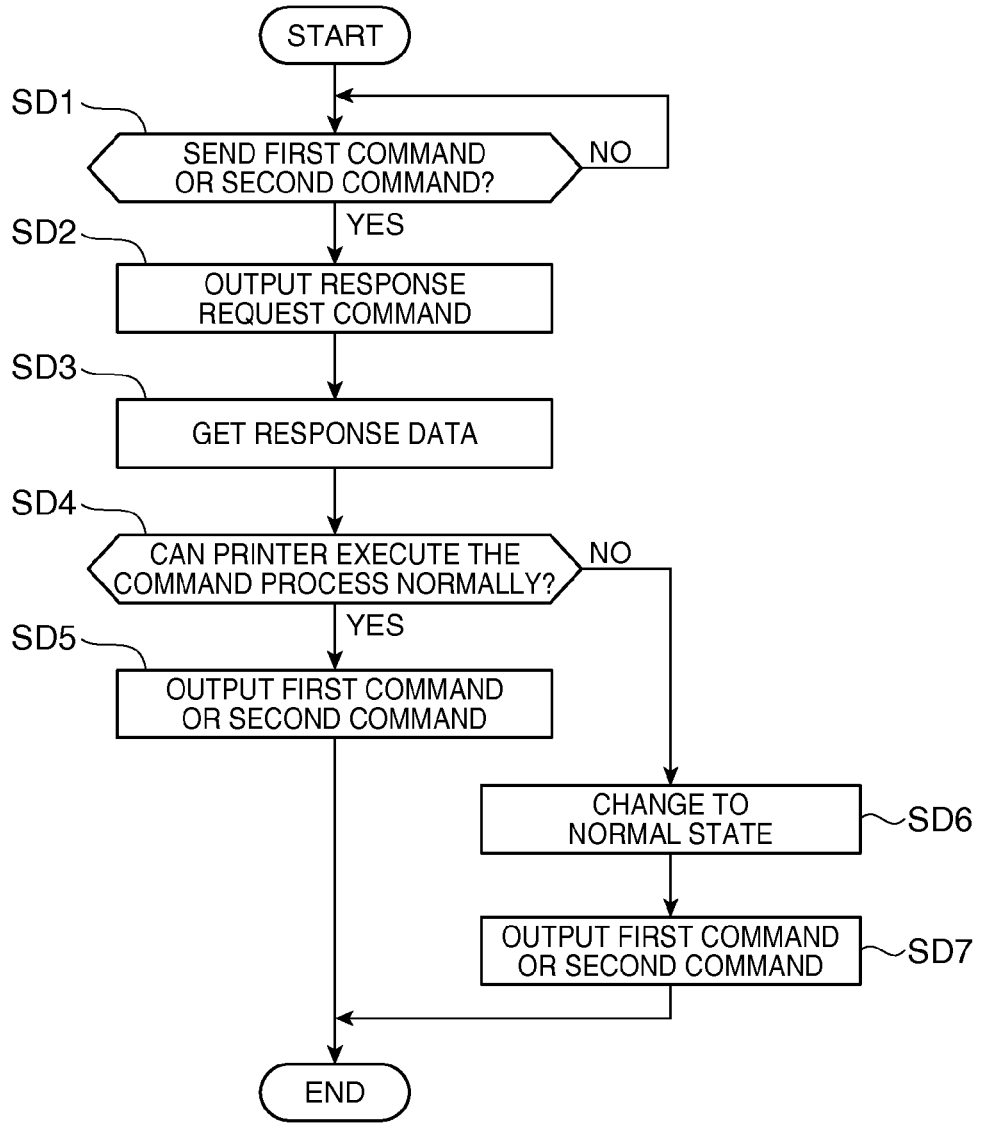
FIG. 5 is a flow chart showing the operation of the host computer.

FIG. 5 is a flow chart describing the operation of the host computer 10.

The printer driver execution unit 15b of the host computer 10 monitors if a first command or a second command is to be output to the printer 12 (step SD1).

If a first command or a second command is to be output (step SD1 returns Yes), the printer driver execution unit 15b outputs the response request command described above before outputting the command (step SD2).

The printer driver execution unit 15b then receives the response data to the response request command from the printer 12 (step SD3). As described above, the response data includes information indicating if the start-recording position data 37a is the default value or a value indicating some other start-recording position, and information indicating if drive data remains in the line buffer 37c.

The printer driver execution unit 15b then determines if the condition of the printer 12 enables normally executing a first command if a first command is to be output, and determines if the condition of the printer 12 enables normally executing a second command if a second command is to be output (step SD4).

More specifically, if a first command is to be output, the printer driver execution unit 15b determines if there is no drive data in the line buffer 37c and the start-recording position data 37a is set to the default value, and determines that the printer 12 can normally execute the process associated with the first command if there is no drive data in the line buffer 37c and the start-recording position data 37a is set to the default value.

If a second command is to be output, the printer driver execution unit 15b determines if there is no drive data in the line buffer 37c regardless of whether the start-recording position data 37a is set to the default value, and determines that the printer 12 can normally execute the process associated with the second command if there is no drive data in the line buffer 37c.

If step SD4 determines that the printer 12 can normally execute the process associated with the command (step SD4 returns Yes), the printer driver execution unit 15b outputs the first command or second command (step SD5).

If step SD4 determines that the printer 12 cannot normally execute the process associated with the command (step SD4 returns No), the printer driver execution unit 15b changes the state of the printer 12 according to the command to be output so that the command can be executed normally (step SD6).

More specifically, when the first command is to be output, the printer driver execution unit 15b outputs a control command to the printer 12, clears any drive data remaining in the line buffer 37c, and resets the start-recording position data 37a to the default value. If the second command is to be output, the printer driver execution unit 15b outputs a control command to the printer 12 and clears any drive data remaining in the line buffer 37c. As a result, the printer 12 can execute the process associated with the command normally.

Next, the printer driver execution unit 15b outputs the first command or second command to the printer 12 (step SD7).

By executing the foregoing process, the printer 12 can reliably be made to execute the process associated with the command when a first command or second command is output.

As described above, a recording system 1 according to this embodiment of the invention includes a host computer 10 and printer 12. The host computer 10 can output a response request command requesting a response containing information denoted by the start-recording position data 37a and information (information related to drive data) indicating whether or not (converted) drive data remains in the line buffer 37c. Based on the response data output by the printer 12 in response to the response request command, the host computer 10 can also detect recording problems in the printer 12.

As a result, by appropriately outputting a response request command to the printer 12 and receiving response data, the host computer 10 can determine the start-recording position of the printer 12 and the status of the line buffer 37c, and based on the acquired information can quickly detect recording problems in the printer 12.

Furthermore, after detecting a recording problem in the printer 12 based on response data input from the printer 12, the host computer 10 in this embodiment of the invention causes the printer 12 to reset the start-recording position data 37a and clear the line buffer 37c, thereby eliminating the recording problem of the printer 12.

As a result, the cause of such problems can be quickly eliminated when a recording problem occurs in the printer 12 due to the start-recording position or the line buffer 37c state.

If a recording problem in the printer 12 is detected while the printer 12 is driven to issue a receipt, this embodiment of the invention first resolves the recording problem and then executes the receipt production process from the beginning again.

As a result, a correctly printed receipt that does not contain incorrectly recorded images can be issued.

In this embodiment of the invention the host computer 10 outputs a response request command before outputting a first command or second command, and based on response data input in response to the request command determines if the printer 12 can normally execute the process associated with the first command or second command.

As a result, the response request command can be used before the first command or second command is output to determine if the printer 12 can normally execute the processes associated with those commands.

In addition, when the host computer 10 in this embodiment of the invention determines that the printer 12 cannot normally execute the process associated with the first command or second command to be output, it controls the printer 12 to change to a state in which the process can be executed.

As a result, even if the state of the printer 12 before the first command or second command is output does not enable normally executing the process associated with the command, the first command or second command can be output after restoring the printer 12 to a state in which normal execution is possible.

Furthermore, if when a first command or second command is to be output in this embodiment of the invention the combination of the start-recording position indicated by the start-recording position data 37a and the state of the line buffer 37c in the printer 12 do not match the combination required to normally execute the process associated with the first command or second command that is to be output, and the host computer 10 determines that the printer 12 cannot normally execute the process, the host computer 10 causes the printer 12 to reset the start-recording position data 37a and clear the start-recording position data 37a so that the combination of the value of the start-recording position in the printer 12 and the line buffer 37c state match the combination enabling normally executing the process associated with the command, and then outputs the command.

As a result, the first command or second command can be output after restoring a state enabling normal process execution even if the printer 12 cannot normally execute the process before the first command or second command is output because the combination of the value of the start-recording position in the start-recording position data 37a of the printer 12 and the buffer state does not match the combination enabling normal execution of the process associated with the first command or second command that is to be output.

A preferred embodiment of the invention is described above, but the invention is not limited thereto and can be modified and applied in many ways without departing from the scope of the accompanying claims.

Output of the response request command and detection of recording problems in the printer 12 are handled by functions of the printer driver in the embodiment described above, but these functions can be achieved by a program other than the printer driver.

The content of operations performed by the control unit 15 of the printer 12 is stored in the printer-side storage unit 36 as a program above, but the same content can be stored to a removable storage medium, and this storage medium can be installed to the printer 12 to enable execution of the content by the control unit 15.

The printer 12 is described in the foregoing embodiment as a thermal line printer, but the printer 12 that is controlled by the host computer 10 is not limited to a thermal line printer, and may be an inkjet printer or dot impact printer, for example. More specifically, the invention can be widely applied to recording devices that write drive data to a buffer and drive a recording head based on the buffered drive data, to control devices that control the recording device, and to systems including the recording device and the control device.

What is claimed is:

1. A method of controlling a recording device that can connect to a control device, comprising steps of:
   generating and writing to a storage unit drive data that drives a recording head based on data received from the control device;
   reading the drive data from the storage unit, driving the recording head, and recording on a recording medium;
   sending to the control device information denoting a first position, which is the position where the drive data is written in the storage unit or the position where reading and recording the drive data starts, or information denoting a second position, which is the position where writing the drive data in the storage unit ends or the position where reading and recording the drive data ends; and
   setting the first position to a default value when the drive data is fully recorded on the recording medium such that sending to the control device the information denoting the first position includes sending the default value when the drive data is fully recorded on the recording medium;
   wherein the first position is a value that is not the default value when the drive data is not fully recorded on the recording medium such that sending to the control device the information denoting the first position does not include sending the default value when the drive data is not fully recorded on the recording medium.

2. The method of controlling a recording device described in claim 1, wherein:
   information related to the drive data in the storage unit before recording is sent with information denoting the first position to the control device.

3. The method of controlling a recording device described in claim 1, wherein:
   information related to the drive data in the storage unit after recording is sent with information denoting the second position to the control device.

4. The method of controlling a recording device described in claim 1, wherein:
   the drive data is generated and written to the storage unit in line units, and the first position is the position where the drive data is written or the position where reading and recording the drive data starts in the line, and the second position is the position where writing the drive data ends or the position where reading and recording the drive data ends in the line.

5. The method of controlling a recording device described in claim 1, wherein:
the drive data is generated and written to the storage unit in page units, and the first position is the position where the drive data is written or the position where reading and recording the drive data starts on the page, and the second position is the position where writing the drive data ends or the position where reading and recording the drive data ends on the page.

6. The method of controlling a recording device described in claim 1, further comprising a step of:
clearing the drive data in the storage unit based on a command received from the control device to clear the storage unit.

7. The method of controlling a recording device described in claim 1, further comprising a step of:
recording the drive data in the storage unit from a specified position based on a re-recording command received from the control device.

8. The method of controlling a recording device described in claim 1, wherein:
when the drive data is fully recorded on the recording medium, the information denoting the second position reflects an end of a line or an end of a page, and
when the drive data is not fully recorded on the recording medium, the information denoting the second position reflects a random location within a line or a random location within a page.

9. A recording device that can connect to a control device, comprising:
a control unit that generates and writes to a storage unit drive data that drives a recording head based on data received from the control device, and reads the drive data from the storage unit, drives the recording head, and records on a recording medium;
wherein the control unit
sends to the control device information denoting a first position, which is the position where the drive data is written in the storage unit or the position where reading and recording the drive data starts, or information denoting a second position, which is the position where writing the drive data in the storage unit ends or the position where reading and recording the drive data ends, and
setting the first position to a default value when the drive data is fully recorded on the recording medium such that sending to the control device the information denoting the first position includes sending the default value when the drive data is fully recorded on the recording medium; and
wherein the first position is a value that is not the default value when the drive data is not fully recorded on the recording medium such that sending to the control device the information denoting the first position does not include sending the default value when the drive data is not fully recorded on the recording medium.

10. The recording device described in claim 9, wherein:
the control unit sends information related to the drive data in the storage unit before recording together with information denoting the first position to the control device.

11. The recording device described in claim 9, wherein:
the control unit sends information related to the drive data in the storage unit after recording together with information denoting the second position to the control device.

12. The recording device described in claim 9, wherein:
the control unit generates and writes the drive data to the storage unit in line units, and the first position is the position where reading and recording the drive data starts in the line, and the second position is the position where reading and recording the drive data ends in the line.

13. The recording device described in claim 9, wherein:
the control unit generates and writes the drive data to the storage unit in page units, and the first position is the position where reading and recording the drive data starts on the page, and the second position is the position where reading and recording the drive data ends on the page.

14. The recording device described in claim 9, wherein:
the control unit clears the drive data in the storage unit based on a command received from the control device to clear the storage unit.

15. The recording device described in claim 9, wherein:
the control unit records the drive data in the storage unit from a specified position based on a re-recording command received from the control device.

16. A non-transitory storage medium that stores a program for controlling parts of a recording device that can connect to a control device and has a control unit that generates and writes to a storage unit drive data that drives a recording head based on data received from the control device, and reads the drive data from the storage unit, drives the recording head, and records on a recording medium,
wherein the program causes the control unit to
send to the control device information denoting a first position, which is the position where the drive data is written in the storage unit or the position where reading and recording the drive data starts, or information denoting a second position, which is the position where writing the drive data in the storage unit ends or the position where reading and recording the drive data ends, and
setting the first position to a default value when the drive data is fully recorded on the recording medium such that sending to the control device the information denoting the first position includes sending the default value when the drive data is fully recorded on the recording medium; and
wherein the first position is a value that is not the default value when the drive data is not fully recorded on the recording medium such that sending to the control device the information denoting the first position does not include sending the default value when the drive data is not fully recorded on the recording medium.

* * * * *